United States Patent Office 3,477,325
Patented Nov. 11, 1969

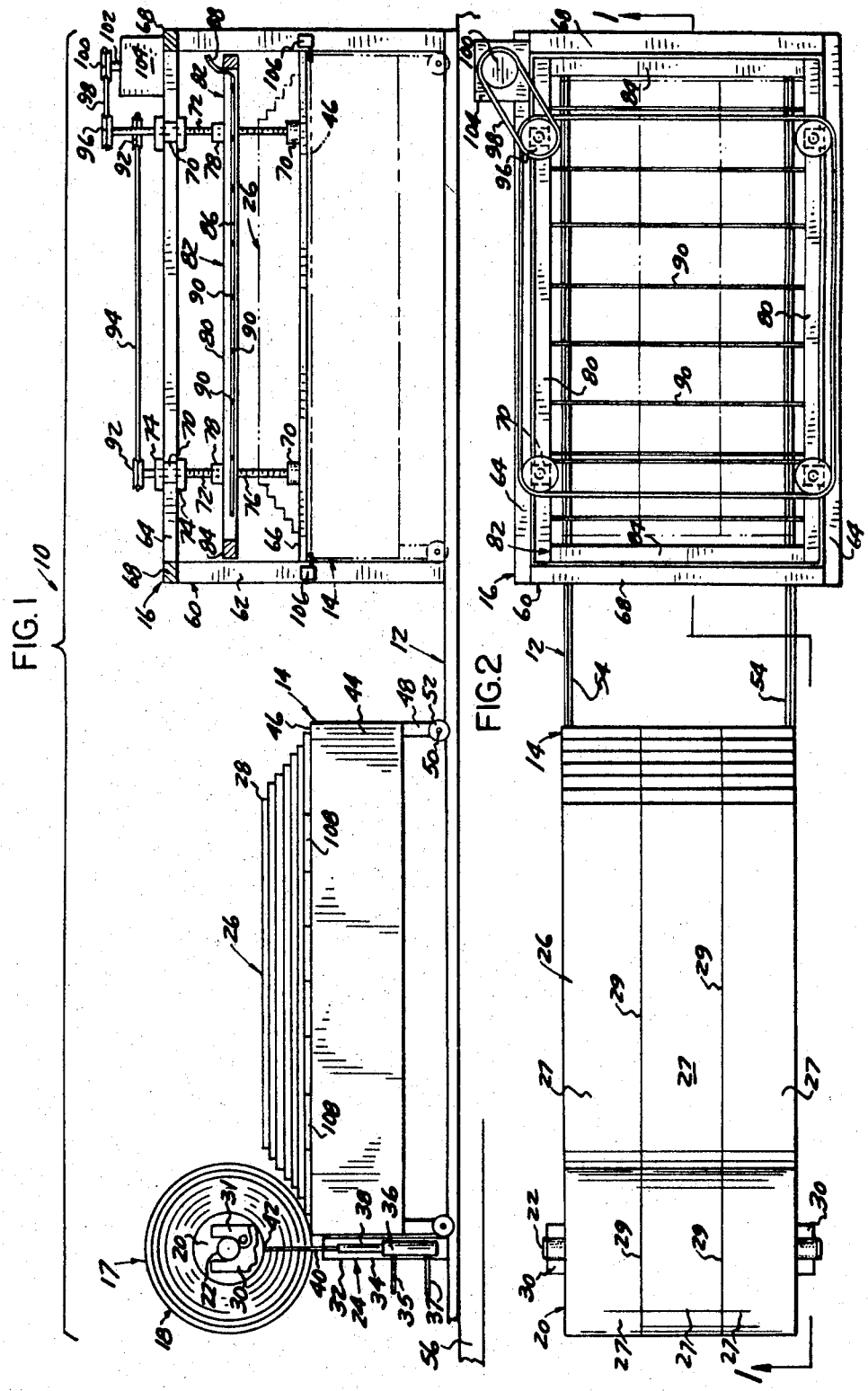

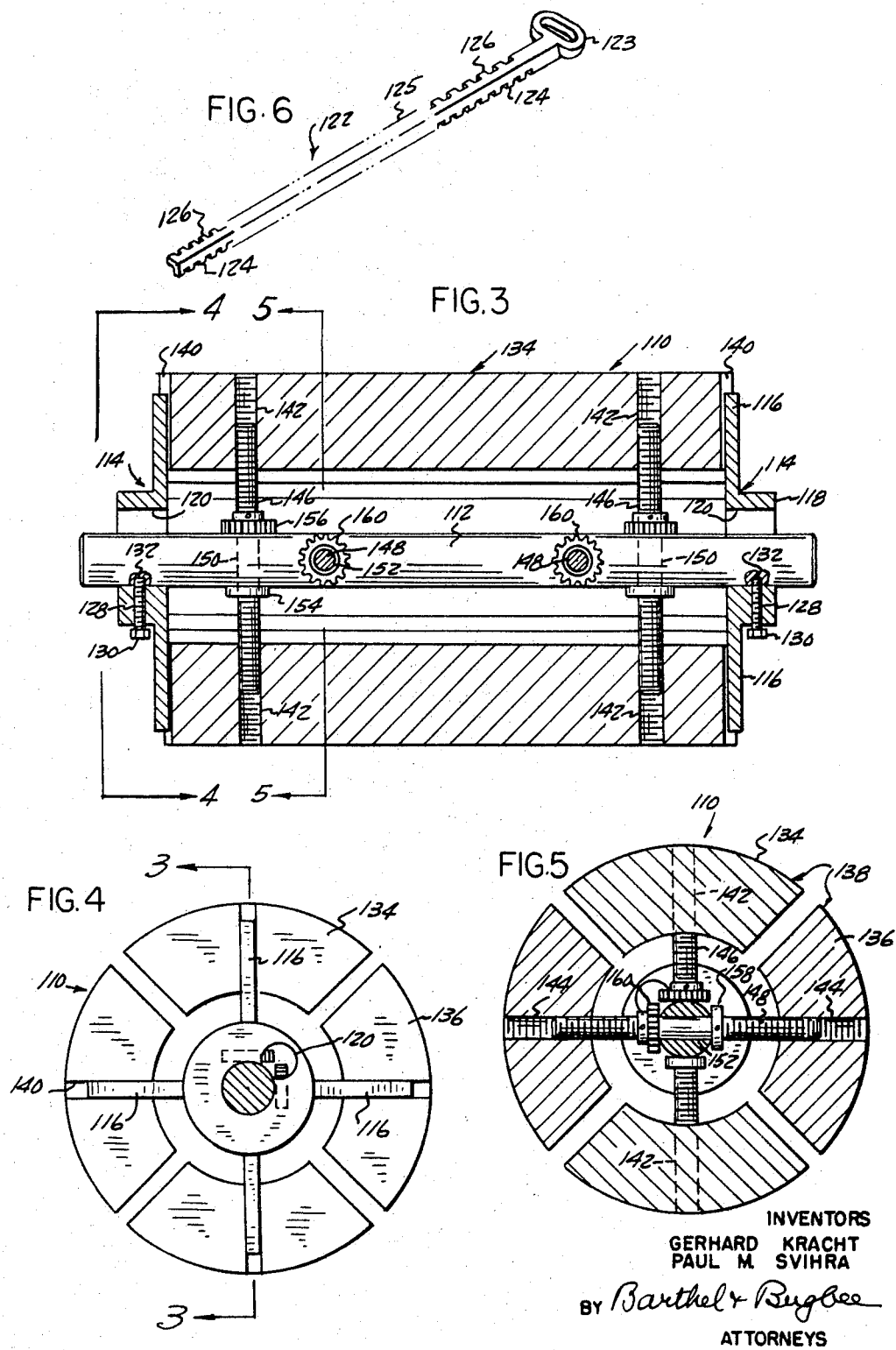

3,477,325
APPARATUS FOR PRODUCING FOAM PLASTIC SHEET STACKS
Gerhard Kracht, Allen Park, and Paul M. Svihra, Inkster, Mich., assignors to Swedish Crucible Steel Company, Detroit, Mich., a corporation of Michigan
Original application Jan. 6, 1967, Ser. No. 607,808. Divided and this application Nov. 18, 1968, Ser. No. 776,684
Int. Cl. B26d 7/10
U.S. Cl. 83—171        11 Claims

ABSTRACT OF THE DISCLOSURE

This apparatus produces stacked foam plastic sheets from spirally-rolled foam plastic material by radially severing the spiral roll of material into stacks of strips while on its core and axle, unrolling and depositing the thus-severed stacks of strips in stepped piles upon a carriage. This carriage is rolled beneath a frame structure carrying a vertically-movable subdividing cutter assembly, such as spaced heated cross wires, which descends and cuts its way through the piles and severs them into subdivided stacks of short lengths and widths. An expansible core (FIGURES 3 to 5) accommodates spiral rolls of foam plastic material having different diameters of central openings.

---

This application is a division of our co-pending application Ser. No. 607,808 filed Jan. 6, 1967 for Method and Apparatus for Producing Foam Plastic Sheet Stacks.

BACKGROUND OF INVENTION

Hitherto, the cutting of foam plastic sheet material, such as foamed styrene polymer, into stacks of smaller sheets has presented great difficulties in which prior methods and machines for cutting paper and plastic sheets have been inadequate or unusable. These prior methods and machines have failed for such use because of the low tensile strength of thin sheet plastic material, the softness and yieldability of such foam plastic material, its extremely low weight (of the order of one pound per cubic foot or less) and the small quantities of sheet material per roll thereof making cutting costs too high for practical commercial sale of the material as an inexpensive packaging, insulating and shock absorbing material. The present invention provides a rapid, accurate and inexpensive apparatus for converting spirally-rolled foam plastic sheet material into stacks of multiple smaller sheets convenient for packaging and accurate in its operation.

In the drawings:

FIGURE 1 is a side elevation, partly in central vertical section, along the line 1—1 in FIGURE 2, one form of apparatus of the present invention useful for carrying out the process, with the cutting table carrying a stack of elongated foam plastic sheets and ready to begin its forward stroke into the cutting unit, and with a spiral roll of sheet plastic material ready to be unrolled on the table at the end of a subsequent return stroke of the cutting table;

FIGURE 2 is a top plan view of the apparatus shown in FIGURE 1;

FIGURE 3 is a longitudinal central section taken along the line 3—3 in FIGURE 4, through an expansible core which may be substituted for the non-expansible core of FIGURE 1;

FIGURE 4 is a vertical cross-section, mainly in end elevation, taken along the line 4—4 in FIGURE 3;

FIGURE 5 is a vertical cross-section taken along the line 5—5 in FIGURE 3; and

FIGURE 6 is a perspective view, looking downward from above of an operating rack bar for actuating the expansible core of FIGURES 3 to 5 inclusive.

Referring to the drawings in detail, FIGURES 1 and 2 show a foam plastic sheet cutting apparatus, generally designated 10, according to one form of the invention as consisting generally of a parallel-rail trackway 12 upon which a supporting table 14 is reciprocably supported for travel into and out of a subdividing cutting unit 16 after an assembly 17 consisting of a spiral roll 18 of foam plastic sheet material wound upon a core 20 supported by a shaft 22 has been cut radially by a radial cutting unit 24 before being unrolled into a stack 26 of thin individual foam plastic sheets 28 upon the supporting table 14. The roll of foam sheet plastic material is produced in the form of a hollow cylindrical block in any suitable apparatus, such as, for example, in the expanded plastic molding machine disclosed and claimed in the Kracht Patent 3,224,039 issued Dec. 21, 1965 for Expanded Plastic Molding Machine. The hollow cylindrical block of foam plastic material thus produced is transferred to a conventional slicing machine (not shown) where it is rotated on a core while subjected tangentially to the action of a horizontal knife which peels off the foam plastic material from the cylindrical block in the form of a greatly-elongated web of thin foam sheet plastic material. This web as it comes off the cylindrical block, is immediately cut into strips 27 of convenient widths by laterally-spaced vertical knives (not shown) such as razor blades forming longitudinal slits 29 and spirally wound upon the core 20 which in turn is rotatably supported by the shaft 22. It is in this spirally-wound form that the spiral roll 18 is carried to the foam plastic sheet cutting machine 10 of FIGURES 1 and 2, as shown in the upper left-hand corner thereof after radial cutting has been performed. The spirally-wound roll 18 is extremely light in weight and easily handled, being of the order of 60 pounds for a roll four feet in length and approximately three feet in diameter.

RADIAL CUTTING UNIT

The shaft 22 and core 20 containing the spirally-wound roll 18 of foam sheet plastic material is supported at its opposite ends in stationary vertical top-notched brackets 30 with swinging stops 31. The lower portions of the brackets 30 have been broken away to disclose the structure behind them. The radial cutting unit 24, positioned between these brackets, consists of a vertical frame structure 32 wtih spaced uprights 34. Mounted on the outer sides of the frame structure uprights 34 are two laterally-spaced vertical cylinders 36 provided with fluid pressure service lines 35 and 37 leading to a conventional reversing valve (not shown) and thence to a source of pressure fluid such as pressurized hydraulic oil or compressed air. In the use of compressed air, one of the service lines may, of course, be omitted since the cylinder 36 may then exhaust into the open air without inconvenience.

Reciprocably mounted in each cylinder 36 (of which only one is shown) is a piston 38 from the upper end of which an insulated rod 40 extends upward. Extending between the upper ends of the rods 40 is an electrically-conducting resistance filament, such as nickel-chromium alloy cutting wire 42, the opposite ends of which are connected to a source of electric current (not shown) having a voltage of 25 to 40 volts, in the interest of safety for the operator. From FIGURE 1 it will be seen that the radial cutter 24 is in its position at the end of the radial cutting stroke of the pistons 38, rods 40 and cutting wire 42. As will be seen under the description of the operation of the invention, the passage of electricity through the cutting wire 42 causes it to become heated sufficiently to burn its way through the spirally-rolled foam plastic material 18 on the core 20.

The supporting table 14 has a rectangular top structure 44 with a flat top surface 46 upon which the radially-cut plastic material stack 26 is rolled after being cut radially by the rot wire 42. Extending downward from the four corners of the table top structure 44 are four parallel vertical legs 48 which at their lower ends carry axles 50 supporting grooved or flanged track wheels 52 rollably along the trackway 12. As seen in FIGURE 2, the trackway 12 consists of parallel tracks 54 secured by any suitable means to the floor 56 of the building in which the machine 10 is set up. The supporting table 14 is movable along the tracks 54 into the dotted line position shown at the right-hand end of FIGURE 1 into the supporting framework, generally designated 60, of the subdividing cutting unit 16. The framework 60 is a rectangular structure consisting of uprights 62 disposed at the four corners of a rectangle slightly larger than the rectangular table top structure 44 and is interconnected by upper and lower longitudinal members 64 and 66 and cross members 68.

Projecting inwardly from the upper and lower longitudinal members 64 and 66 are four pairs of aligned longitudinally-spaced bearing blocks 70. Each pair of the bearing blocks 70 rotatably supports the smooth upper and lower end portions of a screw shaft 72 which is held against vertical motion by thrust bearings 74. Threadedly engaging the intermediate threaded portions 76 of each of the screw shafts 72 is a stationary internally-threaded nut 78. The nuts 78 are mounted on and bolted or otherwise fixedly secured to the upper sides of the parallel longitudinal members 80 of a vertically-movable rectangular cutting frame 82 having the cross members 84 interconnecting the opposite ends.

Extending lengthwise along the longitudinal members 80 of the cutting frame 82 are electrical conductors 86 which are connected at one end to flexible electric cables 88. These in turn are connected to a source of electric current (not shown). Electrically connected to and extending between the parallel conductors 86 are longitudinally-spaced parallel laterally-extending cutting filaments or cross wires 90 separated from one another by distances corresponding to the longitudinal dimensions of the stacks of foam plastic sheets desired, the lateral dimensions of which have been determined by the separations of the longitudinal slits 29 as determined by the separations of the cutting knives which formed them.

Mounted upon and secured to each of the four screw shafts 72 at its upper end is a grooved pulley 92, the four pulleys 92 being encircled and drivingly engaged by an endless V-belt 94. Mounted upon and drivingly secured to the upper end of one of the screw shafts 72 is a pulley 96 drivingly connected by a V-belt 98 to a pulley 100 on the outer end of the output shaft 102 of a speed-reducing electric motor drive unit 104 mounted on an upper corner of the supporting framework 60. The electric motor of the driving unit 104 is reversible so as to permit rotation of the screw shafts 72 in opposite directions of rotation so as to raise or lower the cutting frame 82. The energization and reversal of the electric motor of the drive unit 104 are controlled by a conventional electric motor energization and control circuit (not shown) including one or more limit switches 106. The latter are activated by engagement with the descending cutting frame 82 to reverse the motor of the drive unit 104 and shut off the supply of current to the cutting wires 90 when the wires 90 have moved into close proximity to the top surface 46 of the supporting table 14, as explained below in connection with the operation of the invention.

In the operation of the machine 10 of the invention and in carrying out the process of the invention, let it be assumed that an elongated web 18 of thin foam plastic material has been divided into a plurality of elongated strips 27 by the longitudinal slits 29 cut by the laterally-spaced knives (not shown) and spirally wound upon the core 20 on the shaft 22. The assembly 17 thereof is then transferred from the winding and reeling device (not shown) to the top-notched brackets 30 after the radial cutting wire 42 has been moved downward to its lowermost position by retracting the pistons 38 into their respective cylinders 36. Electric current is then supplied to the radial cutting wire 42 and pressure fluid supplied to the lower service line 37 and exhausted from the upper line 35. As a result, the pistons 38 and rods 40 move upward, carrying with them the heated wire 42 which burns its way rapidly through the spiral roll 18 of foam plastic sheet material and comes to a halt adjacent the lower side of the core 20. Pressure fluid is then admitted to the upper service line 35 and discharged from the lower line 37, causing the pistons 38 and rods 40 and wire 42 to descend to a level below the top surface 46 of the cutting table 14.

The assembly 17 is then released from the brackets 30 by swinging downward the stops 31 and the web 18 rolled out upon the top surface 46 of the cutting table 14. This action causes the separate sections 28 of the strips 27 severed therefrom by the radial cutting wire 42 to come to rest in the horizontal elongated pile 26 of such sections 28. Since the sections 28 of the pile become progressively shorter from the lowermost to the uppermost, due to the decrease in diameter of the spiral roll 18 as it approaches the core 20, the opposite ends of the stack 16 present a stepped appearance.

The supporting table 14 is then rolled along the trackway 12 into the space beneath the supporting framework 60 of the subdividing cutting unit 16. The motor drive unit 104 is then operated to rotate the screw shafts 72 in a direction causing the nuts 78 to travel downward therealong, while at the same time the flexible cables 88 are energized to heat the cutting cross wires 90. As the cutting frame 82 is caused to descend by the rotation of the screw shaft 72, its hot cross wires 90 cut their way through the horizontal stack of thin foam plastic sheets 28, further subdividing the strips 27 into short lengths determined by the spacing of the cross wires 90.

When the cutting frame 82 has descended to a level where the cutting cross wires 90 have come into close proximity to the top surface 46 of the cutting table 14, it encounters the limit switch or switches 106 which in turn cause the control circuit to reverse the electric motor of the speed-reducing motor drive unit 104. This action rotates the screw shaft 72 in a reverse direction to cause the cutting frame 82 to ascend to its raised position shown in FIGURE 1, carrying with it the cutting wires 90. The invention contemplates that the top surface 46 of the cutting table 14 will be provided with sheets 108 of packaging material, such as strips of corrugated cardboard, which are of approximately the sizes of the stacks of subdivided foam sheets produced by the machine 10.

The stepped end portions of the opposite ends of the stack 26 constitute scrap and are conveniently discarded or used for other purposes because of the relative cheapness of the foam plastic material in comparison with the cost of handling it.

After the completion of the cutting operation and the retraction of the cutting frame 82 and its cutting wires 90 to the raised position shown in FIGURE 1, the cutting table 14 with its subdivided stacks of foam plastic material is now rolled back into the solid line position shown in FIGURE 1, ready for another cycle of operation as described above.

EXPANSIBLE CORE FOR RADIAL CUTTING UNIT

The expansible core, generally designated 110, shown in FIGURES 3, 4 and 5, is adapted to be substituted for the fixed core 20 of FIGURES 1 and 2, because the expansion or contraction of the core 20 by winding or unwinding sheet material relatively thereto is a more time-consuming means of changing the diameter of the core 20 to adapt it to different sizes of opening in the spiral roll 18 of foam plastic sheet material. The expansible core 110 includes a central axle 112 near the opposite ends of which are mounted guide members 114 carrying radial arms 116 preferably integral with the hubs 118 of the guide members 114, which thus may be designated as guide spiders. The hubs 118 are provided with eccentrically-located access openings 120 for the insertion of an operating rack bar, generally designated 122, shown in FIGURE 6, and provided at one or both ends with a handle 123 secured thereto. The operating rack bar 122 (FIGURE 6) has a shank or stem 125 of L-shaped or angle cross-section and along its outer edges is provided with rack teeth 124 and 126 respectively, the operation of which is described below. The hubs 118 are drilled and threaded radially as at 128 to receive locking screws or bolts 130, the inner ends of which enter sockets 132 in the opposite end portions of the axle 112 to position the guide members 114 at a predetermined axial separation from one another. The outer ends of the axle 112 project beyond the hubs 118 in order to enter and be supported by the stationary vertical top-notched brackets 30 (FIGURE 1).

Radially slidably mounted relatively to the axle 112 are two pairs of quadrant core components 134 and 136 which in assembly make up a hollow incomplete cylinder 138. The latter is composed of the four components or sectors 134 and 136. Each of the components 134 and 136 in each of its opposite ends is provided with a radial guide groove 140 which slidably engages a correspondingly-located arm 116 of the adjacent guide member 114. Each component or sector 134 or 136 is also bored and threaded radially, one pair of the sectors 134 having threaded radial bores 142 disposed nearer the end grooves 136 thereof than the radial bores 144 in the other pair of sectors 136. The threadings of the two aligned bores 142 are of opposite hand, as are also the two opposite aligned bores 144. In other words, one bore of each pair of these bores has a right-hand thread and the other a left-hand thread.

Aligned with the threaded radial bores 142 and 144 are correspondingly-threaded pairs of screw shafts 146 and 148 respectively, the central smooth portions of which are rotatably mounted in diametral bores 150 and 152 respectively in the axle 112. The outer screw shafts 146 are held in fixed positions axially, while permitted to rotate, by collars 154 and pinions 156 fixedly secured to their respective shafts 146 at opposite ends of their bores 150 in the axle 112. Similarly, the smooth central portions of the screw shafts 148 (FIGURE 5) are held against axial motion by collars 158 and pinions 160 also fixedly secured to their respective shafts. The threaded opposite ends of the shaft 148 are also provided with threads of opposite hand to match the threads of their respective bores 144.

In the operation of the expansible core 110, to expand or contract the core, the operator grasps the handle 123 of the operating rack bar 122 and thrusts the toothed shank 125 through one of the access openings 120 and slightly to one side of and out of mesh with the pinions 156 and 160 until the forward end of the shank 125 reaches the opposite access opeening 120. He then swings the shank 125 inward so that its teeth 124 and 126 mesh with the pinions 156 and 160. Then, by pushing or pulling on the toothed shank 125 of the operating rack bar 122 by means of the handle 123, he rotates the pinions 156 and 160 and their respective screw shafts 146 and 148 in one direction or the other so as to propel the cylinder components or sectors 134 and 136 outward or inward to expand or contract the bore 110, as desired.

We claim:
1. An apparatus for producing stacks of foam plastic sheets from an elongated web wound in spiral convolutions into a roll thereof, said apparatus comprising
   a roll support,
   a roll convolution cutting disposed adjacent said roll support and movable toward and away from said roll support in a direction substantially radial to a roll thereon,
   a substantially flat web-section-supporting structure disposed adjacent said roll support and adapted to receive a pile of web sections deposited thereon in response to the unrolling of the radially cut roll therealong,
   a web-section-subdividing structure including a frame disposed adjacent said web-section-supporting structure and having a plurality of longitudinally-spaced web-section-subdividing cutters thereon movable transversely thereto,
   means for moving one of said structures into overlapping relationship with the other structure whereby to position the pile of web sections beneath said web-section-subdividing cutters,
   and means for moving said web-section subdividing cutters toward said web-section-supporting structure into substantial engagement therewith whereby to subdivide the pile of web sections thereon into multiple stacks of foam plastic sheets.

2. An apparatus, according to claim 1, wherein said cutters comprise elongated wires and wherein means is provided for heating said wires to effect penetration thereof into the foam plastic material.

3. An apparatus according to claim 2, wherein said wires are composed of electrical-resistance material, and wherein said heating means comprises an electrical energization circuit connected to said wires.

4. An apparatus, according to claim 1, wherein said web-section-subdividing structure includes a cutter subframe carrying said subdividing cutters and movable relatively to said frame toward and away from said web-section-supporting structure when the latter structure is in overlapping relationship with said web-section-subdividing structure.

5. An apparatus, according to claim 4, wherein said moving means includes reversible power-driven mechanism disposed between said frame and subframe and operatively interconnecting the same.

6. An apparatus, according to claim 5, wherein said mechanism includes reversing control means having therein a limit switch responsive to engagement by said subframe to reverse said mechanism.

7. An apparatus, according to claim 1, wherein a trackway is disposed between said structures and wherein one of said structures is mounted upon wheels rollable along said trackway into and out of overlapping relationship with the other structure.

8. An apparatus, according to claim 1, wherein said web-section-subdividing structure frame has an open space in the lower portion thereof beneath said subdividing cutters and wherein said web-section-supporting structure is mounted for travel into and out of said open space into and out of said overlapping relationship.

9. An apparatus, according to claim 1, wherein said roll support inclues an elongated axle and a plurality of partially-cylindrical coaxial sector members disposed around said axle, and also includes mechanism disposed between said axle and said sector members for moving said sector members radially and simultaneously relatively to said axle.

10. An apparatus, according to claim 9, wherein said mechanism includes oppositely-threaded screw shafts threadedly engaging aligned oppositely-threaded bores in said sector members.

11. An apparatus, according to claim 10, wherein said mechanism also includes pinions drivingly connected to said screw shaft and a toothed device engageable with said pinions in meshing relationship therewith for rotating said pinions and said screw shafts.

References Cited

UNITED STATES PATENTS 3,163,066   12/1964   Beaulieu et al. _____ 83—924 XR
3,333,494   8/1967    Smith _____ 83—171 XR LEONIDAS VLACHOS, Primary Examiner U.S. Cl. X.R.

83—404, 924